United States Patent
Tseng et al.

(10) Patent No.: US 10,355,527 B2
(45) Date of Patent: Jul. 16, 2019

(54) WIRELESS CHARGING RECEIVER WITH VARIABLE RESONANT FREQUENCY

(71) Applicant: Taiwan Semiconductor Manufacturing Company Limited, Hsin-Chu (TW)

(72) Inventors: Chien-Chung Tseng, Zhubei (TW); Alan Roth, Leander, TX (US); Eric Soenen, Austin, TX (US)

(73) Assignee: Taiwan Semiconductor Manufacturing Company Limited, Hsin-chu (TW)

( * ) Notice: Subject to any disclaimer, the term of this patent is extended or adjusted under 35 U.S.C. 154(b) by 30 days.

(21) Appl. No.: 14/332,471

(22) Filed: Jul. 16, 2014

(65) Prior Publication Data

US 2016/0020630 A1    Jan. 21, 2016

(51) Int. Cl.
*H02J 7/02*    (2016.01)
*H02J 50/12*   (2016.01)
*H02J 50/80*   (2016.01)

(52) U.S. Cl.
CPC .............. *H02J 50/12* (2016.02); *H02J 7/025* (2013.01); *H02J 50/80* (2016.02)

(58) Field of Classification Search
CPC .... H02J 7/02; H02J 7/025; H02J 50/12; H02J 7/072; H02J 7/007
USPC ................................................ 320/108, 137
See application file for complete search history.

(56) References Cited

U.S. PATENT DOCUMENTS

| | | | | |
|---|---|---|---|---|
| 2013/0285604 A1* | 10/2013 | Partovi | ................ | H02J 7/0042 320/108 |
| 2013/0307473 A1* | 11/2013 | Han | ........................ | H02J 7/04 320/108 |
| 2014/0028107 A1* | 1/2014 | Kwon | ..................... | H01F 38/14 307/104 |
| 2014/0375256 A1* | 12/2014 | Lee | ........................ | H02J 7/025 320/108 |
| 2015/0115878 A1* | 4/2015 | Park | ....................... | H02J 7/025 320/108 |

FOREIGN PATENT DOCUMENTS

JP    2012518382 A    8/2012
KR   1020110094125    8/2011
(Continued)

OTHER PUBLICATIONS

"Basic Electronics" by D.C. Tayal ("Tayal"), 2010, Himalaya Publishing House, pp. 3, 15, 161, 164, 172.*
(Continued)

*Primary Examiner* — Drew A Dunn
*Assistant Examiner* — Harry O'Neill-Becerril
(74) *Attorney, Agent, or Firm* — Cooper Legal Group, LLC (57) ABSTRACT

At least one of a system or a method for wirelessly charging a device is provided. A wireless receiver is configured to communicate with a device to be charged to determine a desired charge scenario indicative of power to be supplied to the device. Based upon the desired charge scenario, a resonant frequency of the wireless receiver is set. The resonant frequency, in combination with energy transferred from a wireless transmitter, is configured to induce a current in the wireless receiver. Power is supplied to the device based upon the current induced in the wireless receiver.

20 Claims, 7 Drawing Sheets

(56) References Cited

FOREIGN PATENT DOCUMENTS

| KR | 10-2011-0122728 | 11/2011 |
| KR | 1020110133111 | 12/2011 |
| KR | 1020130005571 | 1/2013 |
| KR | 10-2013-0128565 | 11/2013 |
| KR | 10-2013-0128565 A | 11/2013 |
| KR | 10-2014-0014647 | 2/2014 |
| KR | 10-2014-0014647 A | 2/2014 |
| WO | 2010093973 A2 | 8/2010 |
| WO | 2010093997 A1 | 8/2010 |

OTHER PUBLICATIONS

Corresponding Korean application No. 10-2014-0186915, Korean Office action dated Oct. 1, 2016, 10 pages.
Corresponding Korean Application Office Action dated Dec. 1, 2017 (5 pgs) with English translation.

* cited by examiner

WIRELESS CHARGING RECEIVER WITH
VARIABLE RESONANT FREQUENCY

BACKGROUND

Many devices, such as mobile phones, tablets, laptop computers, etc., comprise one or more batteries that allow the devices to be portable. The batteries are recharged by physically connecting the devices to a power supply.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

According to some embodiments, a wireless receiver is provided. According to some embodiments, the wireless receiver supplies power to a device, such as a mobile phone, tablet, laptop computer, etc., to charge the device or a battery of the device. According to some embodiments, power that is output by the wireless receiver is a function of energy transferred from a wireless transmitter to the wireless receiver. In some embodiments, the power that is output by the wireless receiver is also a function of a resonant frequency of the wireless receiver. In some embodiments, the resonant frequency of the wireless receiver is adjustable to adjust the power output.

According to some embodiments, the resonant frequency of the wireless receiver is set or adjusted as a function of a desired charge scenario for the device. According to some embodiments, when the device or a battery of the device is nearly out of electrical charge, a first charge scenario, such as a rapid charge scenario is desirable to rapidly recharge the device. According to some embodiments, when the device or a battery of the device is nearly fully charged, a second charge scenario, such as a trickle charge scenario is desirable to more slowly recharge the device and mitigate a probability that the device will be overcharged.

Figure 1:
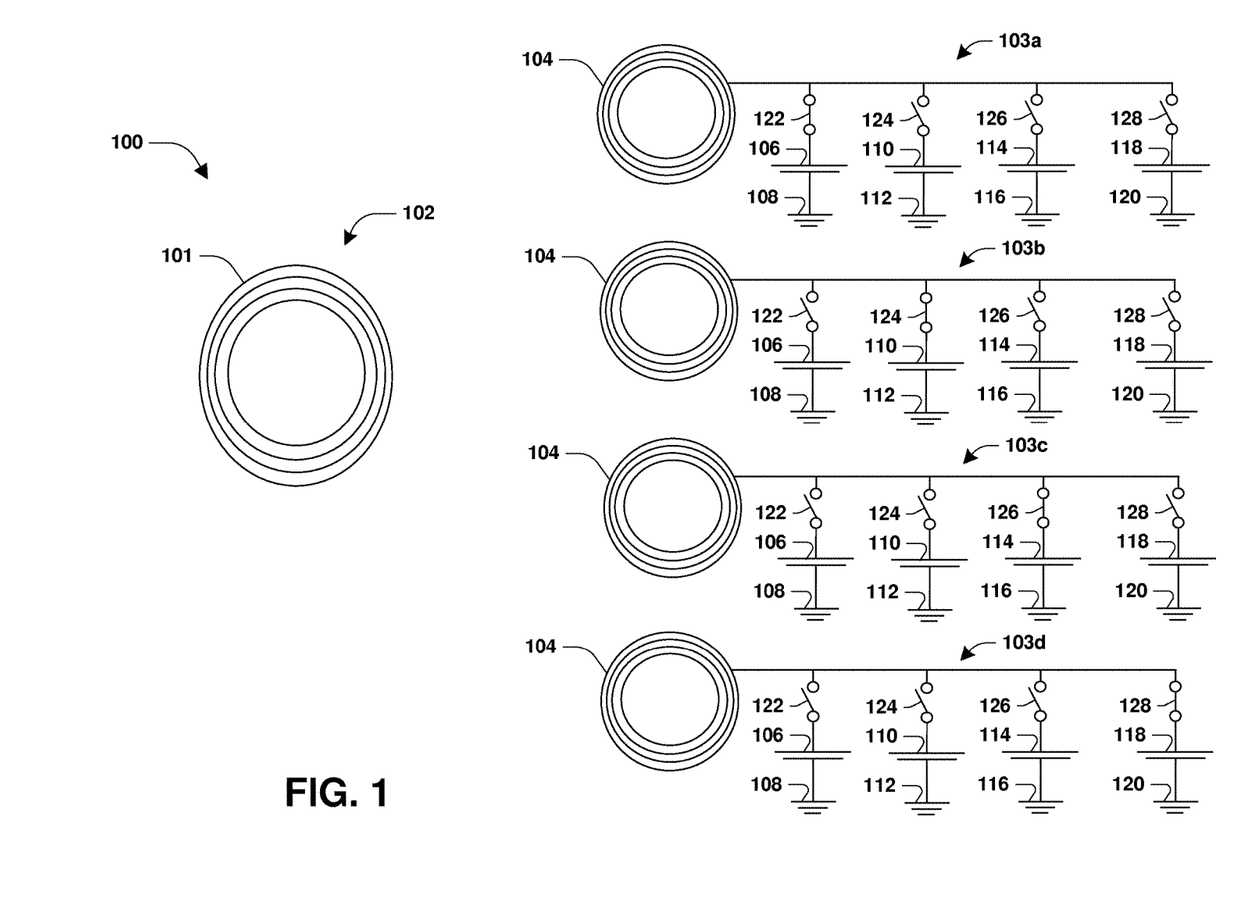
FIG. 1 is an illustration of a circuit for implementing wireless charging, in accordance with some embodiments.

FIG. 1 illustrates a circuit 100 for wireless charging, according to some embodiments. In some embodiments, the circuit 100 comprises a wireless transmitter 102 and a wireless receiver 103, where multiple instances 103a-103d of the wireless receiver 103 are illustrated to depict variations in the resonant frequency of the wireless receiver 103 based upon the desired charge scenario. In some embodiments, a first instance 103a of the wireless receiver illustrates the wireless receiver set to a first resonant frequency when a first charge scenario, such as a rapid charge scenario, is desirable. In some embodiments, a second instance 103b of the wireless receiver illustrates the wireless receiver set to a second resonant frequency when a second charge scenario, such as a trickle charge scenario, is desirable. In some embodiments, a third instance 103c of the wireless receiver illustrates the wireless receiver set to a third resonant frequency when a third charge scenario, such as a maintenance charge scenario, is desirable. In some embodiments, a fourth instance 103d of the wireless receiver illustrates the wireless receiver set to a fourth resonant frequency when a fourth charge scenario, such as a no charge scenario, is desirable.

In some embodiments, the wireless transmitter 102 comprises one or more transmitter coils 101. In some embodiments, a number of turns in respective transmitter coils of the one or more transmitter coils 101 of the wireless transmitter 102 is a function of at least one of an electromagnetic field to be generated by the wireless transmitter 102 or a desired energy to be output by or transferred from the wireless transmitter 102. In some embodiments, the wireless transmitter 102 comprises a number of transmitter coils corresponding to a number of wireless receivers to which the wireless transmitter 102 is to transfer energy.

In some embodiments, the wireless receiver 103 comprises a receiver coil 104 that is connected to at least one of a first capacitor 106, a second capacitor 110, a third capacitor 114 or a fourth capacitor 118. In some embodiments, respective capacitors 106, 110, 114, 118 have a different capacitance. Moreover, in some embodiments, at least one of the first capacitor 106, the second capacitor 110, the third capacitor 114 or the fourth capacitor 118 represent a bank, or array, of capacitors. In some embodiments, the first capacitor 106 represents a first bank of capacitors having a first capacitance, the second capacitor 110 represents a second bank of capacitors having a second capacitance, the third capacitor 114 represents a third bank of capacitors having a third capacitance, and the fourth capacitor 118 represents a fourth bank of capacitors having a fourth capacitance. In some embodiments, at least some of the first capacitor 106, the second capacitor 110, the third capacitor 114 or the fourth capacitor 118 correspond to a same bank of capacitors that is configured in different ways to alter a capacitance of the bank. In some embodiments, the first capacitor 106 corresponds to a bank of capacitors having a first configuration so as to cause the bank of capacitors to have a first capacitance, and the second capacitor 110 corresponds to the bank of capacitors having a second configuration so as to cause the bank of capacitors to have a second capacitance.

In some embodiments, the first capacitor 106 is connected to a first voltage supply 108. In some embodiments, the second capacitor 110 is connected to a second voltage supply 112. In some embodiments, the third capacitor 114 is connected to a third voltage supply 116. In some embodiments, the fourth capacitor 118 is connected to a fourth voltage supply 120. In some embodiments at least one of the first voltage supply, the second voltage supply, the third voltage supply or the fourth voltage supply corresponds to ground.

In some embodiments, at least one of the first capacitor 106, the second capacitor 110, the third capacitor 114 or the fourth capacitor 118 is electrically coupled to the receiver coil 104 by way of at least one switch of a set of switches 122, 124, 126, 128. In some embodiments, electrically coupling the first capacitor 106 to the receiver coil 104 by closing a first switch 122 causes the wireless receiver 103 to be associated with a first resonant frequency. In some embodiments, the association of the wireless receiver 103 with the first resonant frequency causes the wireless receiver 103 to output a first current responsive to receiving energy from the wireless transmitter 102. According to some embodiments, the first capacitor 106 influences a current that is induced in the receiver coil 104 based upon an electromagnetic field generated by the wireless transmitter 102 and received by the receiver coil 104, causing the first current to be output by the wireless receiver 103. In some embodiments, the first current provides a rapid charge scenario to a device coupled to the wireless receiver 103.

In some embodiments, electrically coupling the second capacitor 110 to the receiver coil 104 by closing a second switch 124 causes the wireless receiver 103 to be associated with a second resonant frequency. In some embodiments, the association of the wireless receiver 103 with the second resonant frequency causes the wireless receiver 103 to output a second current responsive to receiving the energy from the wireless transmitter 102. According to some embodiments, the second capacitor 110 influences the current that is induced in the receiver coil 104 based upon the electromagnetic field generated by the wireless transmitter 102 and received by the receiver coil 104, causing the second current to be output by the wireless receiver 103. In some embodiments, the second current provides a trickle charge scenario to the device coupled to the wireless receiver 103, where the device charges more slowly in the trickle charge scenario as compared to the rapid charge scenario.

In some embodiments, electrically coupling the third capacitor 114 to the receiver coil 104 by closing a third switch 126 causes the wireless receiver 103 to be associated with a third resonant frequency. In some embodiments, the association of the wireless receiver 103 with the third resonant frequency causes the wireless receiver 103 to output a third current responsive to receiving the energy from the wireless transmitter 102. According to some embodiments, the third capacitor 114 influences the current that is induced in the receiver coil 104 based upon the electromagnetic field generated by the wireless transmitter 102 and received by the receiver coil 104, causing the third current to be output by the wireless receiver 103. In some embodiments, the third current provides a maintenance charge scenario to the device coupled to the wireless receiver 103, where the device charges more slowly in the maintenance charge scenario as compared to the trickle charge scenario. In some embodiments, the third current substantially maintains a present or current level of charge at the device, instead of increasing or decreasing the charge.

In some embodiments, electrically coupling the fourth capacitor 118 to the receiver coil 104 by closing a fourth switch 128 causes the wireless receiver 103 to be associated with a fourth resonant frequency. In some embodiments, the association of the wireless receiver 103 with the fourth resonant frequency causes the wireless receiver 103 to output a fourth current responsive to receiving the energy from the wireless transmitter 102. According to some embodiments, the fourth capacitor 118 influences the current that is induced in the receiver coil 104 based upon the electromagnetic field generated by the wireless transmitter 102 and received by the receiver coil 104, causing the fourth current to be output by the wireless receiver 103. In some embodiments, the fourth current provides a no charge scenario to the device coupled to the wireless receiver 103. In some embodiments, the fourth current is substantially zero such that little to no current is provided to the device by the wireless receiver 103.

In some embodiment, where the voltage applied to the device by the wireless receiver 103 is substantially constant, varying the current based upon the desired charge scenario causes the power supplied to the device by the wireless receiver 103 to change. According to some embodiments, more power is provided to the device by the wireless receiver 103 when the first current is output by the wireless receiver 103 than when the second current is output by the wireless receiver because the first current is greater than the second current.

As an example operation, the device is configured for a current of 1.0 amps and a voltage of 5 volts. During a rapid charge scenario, the wireless receiver 103 outputs 5 Watts of power, where the current is 1.0 amps and the voltage is 5 volts. During a trickle charge scenario, the wireless receiver 103 outputs 2.5 Watts of power, where the current is 0.5 amps and the voltage is 5 volts. During a maintenance charge scenario, the wireless receiver 103 outputs 1.5 Watts of power, where the current is 0.3 amps and the voltage is 5 volts. During a no charge scenario, the wireless receive 103 outputs substantially 0 Watts of power, where the current is substantially 0 amps and the voltage is 5 volts. Accordingly, the wireless receiver 103 adjust the current that is output, and thus the power supplied to the device, based upon a desired charge scenario for the device. The foregoing values are not meant to be limiting, as other values, of at least one of power, current or voltage, are contemplated.

In some embodiments, the wireless transmitter 102 is used to wirelessly transfer energy to the wireless receiver 103 and to one or more other wireless receivers concurrently. In some embodiments, the wireless transmitter 102 is used to wirelessly transfer energy to the wireless receiver 103 and to one or more other wireless receivers individually or not concurrently.

According to some embodiments, the electromagnetic field produced by the wireless transmitter 102 is a function of a current through the transmitter coil 101. In some embodiments, the current through the transmitter coil 101 remains substantially fixed during respective charge scenarios described herein. According to some embodiments, the energy transferred to the wireless receiver 103 from the wireless transmitter 102 thus remains substantially constant during the respective charge scenarios described herein.

Figure 2:
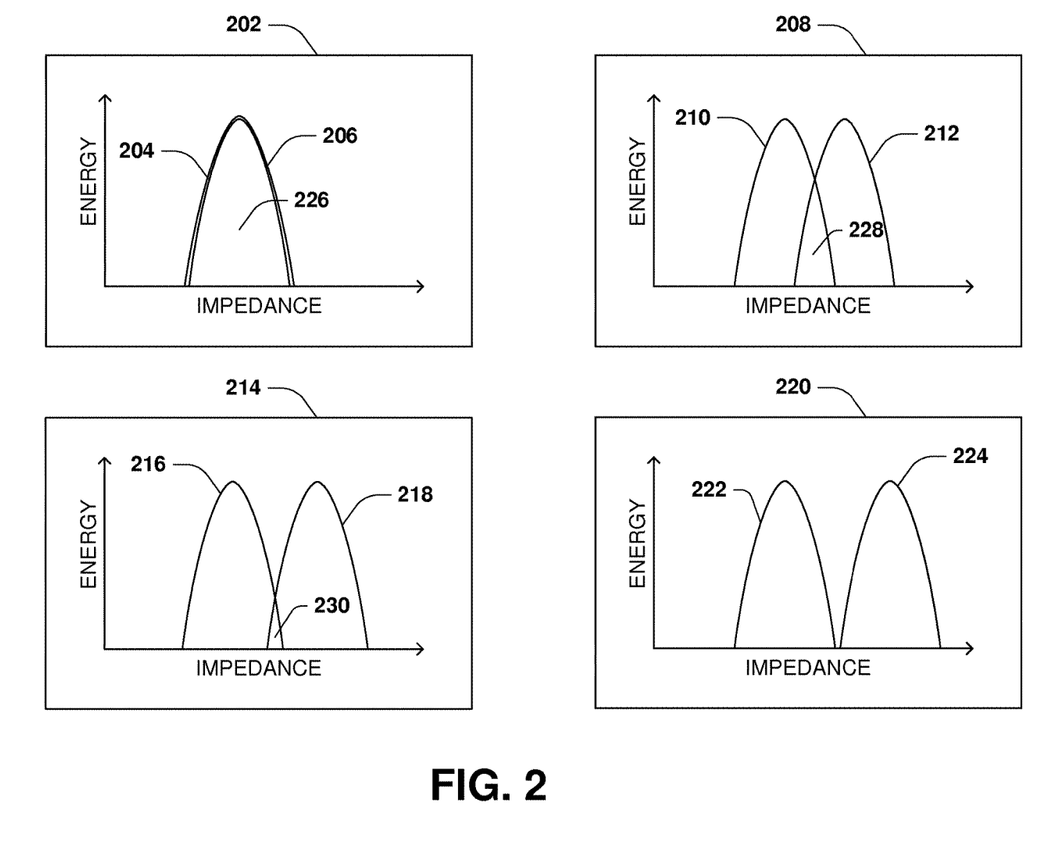
FIG. 2 is an illustration of behavior of a circuit implementing wireless charging, in accordance with some embodiments.

FIG. 2 illustrates various graphs 202, 208, 214, 220 of impedance versus energy for the wireless transmitter 102 and the wireless receiver 103. A first graph 202 corresponds to a rapid charge scenario as described with respect to 103a of FIG. 1. A second graph 208 corresponds to a trickle charge scenario as described with respect to 103b of FIG. 1. A third graph 214 corresponds to a maintenance charge scenario as described with respect to 103c of FIG. 1. A fourth graph 220 corresponds to a no charge scenario as described with respect to 103d of FIG. 1. While the disclosure describes four charge scenarios, the number of possible charge scenarios is greater than four in some embodiments and less than four in some embodiments.

In the graphs 202, 208, 214, 220, an x axis corresponds to impedance and a y axis corresponds to energy. Curves 204, 210, 216, and 222 correspond to properties of the wireless transmitter 102, and curves 206, 212, 218, and 224 correspond to properties of the wireless receiver 103.

Impedance is a function of capacitance, and thus an impedance of the receiver coil 104 of the wireless receiver 103 is a function of the capacitance applied to the receiver coil 104. According to some embodiments, when the first capacitor 106, having a first capacitance, is electrically coupled to the receiver coil 104, the receiver coil 104 has a first impedance as illustrated by curve 206 in the first graph 202. According to some embodiments, when the second capacitor 110, having a second capacitance different than the first capacitance, is electrically coupled to the receiver coil 104, the receiver coil 104 has a second impedance as illustrated by curve 212 in the second graph 208. According to some embodiments, when the third capacitor 114, having a third capacitance different than the first and second capacitance, is electrically coupled to the receiver coil 104, the receiver coil 104 has a third impedance as illustrated by curve 218 in the third graph 214. According to some embodiments, when the fourth capacitor 118, having a fourth capacitance different than the first, second and third capacitance, is electrically coupled to the receiver coil 104, the receiver coil 104 has a fourth impedance as illustrated by curve 224 in the fourth graph 220.

According to some embodiments, a degree of overlap between the curves in respective graphs is indicative of an amount of current output by the wireless receiver 103. According to some embodiments, the current output by the wireless receiver 103 increases as the degree of overlap between the curves increases. According to some embodiments, the first graph 202 illustrates a high degree of overlap 226 between the curve 204 of the wireless transmitter 102 and the curve 206 of the wireless receiver 103, while the fourth graph 220 illustrates little to no overlap between the curve 222 of the wireless transmitter 102 and the curve 224 of the wireless receiver 103. Accordingly, the current output by the wireless receiver 103 will be greater for the rapid charge scenario illustrated by the first graph 202 than for the no charge scenario illustrated by the fourth graph 220. The degree of overlap 228 illustrated by the second graph 208 and the degree of overlap 230 illustrated by the third graph 214 fall between the degree of overlap illustrated by the first graph 202 and the fourth graph 220. Thus, the current output by the wireless receiver 103 during the trickle charge scenario and the maintenance change scenario, respectively, will be between the current output by the wireless receiver 103 during the rapid charge scenario, illustrated by graph 202, and the no charge scenario, illustrated by graph 220.

Figure 3:
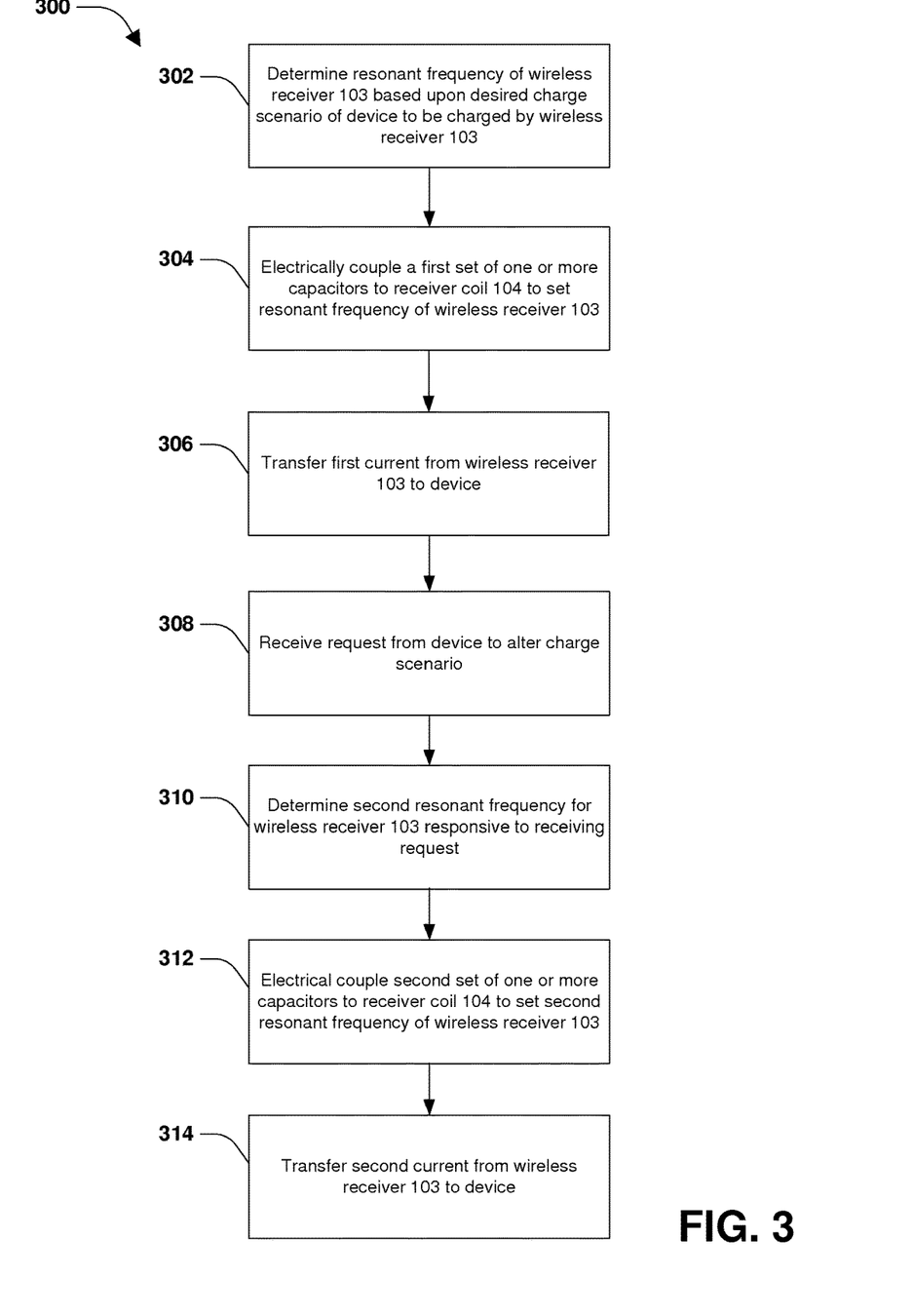
FIG. 3 is a flow diagram illustrating a method for wireless charging, in accordance with some embodiments.

FIG. 3 is a flow diagram illustrating a method 300 for wireless charging, such as using the wireless transmitter 102 and wireless receiver 103 in FIG. 1. At 302, a resonant frequency of the wireless receiver 103 is determined based upon a desired charge scenario of a device to be charged by the wireless receiver. According to some embodiments, when the device is initially coupled to the wireless receiver 103, such as further described with respect to FIG. 5, the device communicates information that is used by the wireless receiver 103 to determine a desired charge scenario. In some embodiments, the information comprises information on a present battery status of the device such as a percentage of remaining battery life or present energy capacity of the battery. In some embodiments, the information comprises information on a desired charge scenario of the device. According to some embodiments, the device communicates to the wireless receiver 103 a request to provide a rapid charge to the device.

At 304, a first set of one or more capacitors is electrically coupled to the receiver coil 104 of the wireless receiver 103 to set the resonant frequency determined at 302. According to some embodiments, where the rapid charge scenario is determined at 302, the first capacitor 106 is electrically coupled to the receiver coil 104 of the wireless receiver 103 to cause the wireless receiver 103 to have the first resonant frequency corresponding to the rapid charge scenario.

At 306, a first current is transferred from the wireless receiver 103 to the device. The first current is produced as a function of the energy transferred between the wireless transmitter 102 and the wireless receiver 103 and the resonant frequency of the wireless receiver 103. According to some embodiments, the first current corresponds to the charge scenario from 302.

At 308, the wireless receiver 103 receives a request from the device to alter the charge scenario and, at 310, a second resonant frequency is determined for the wireless receiver 103 responsive to receiving the request. According to some embodiments, after the device receives the first current from 306 for a period of time, the device becomes 90% charged. As a result, the device requests that the wireless receiver 103 switch from a rapid charge scenario to a trickle charge scenario, causing a second resonant frequency to be selected.

At 312 in the example method 300, a second set of one or more capacitors are electrically coupled to the receiver coil 104 of the wireless receiver 103 to set the second resonant frequency determined at 310. According to some embodiments, where the trickle charge scenario is selected at 310, the first capacitor 106 is electrically decoupled from the receiver coil 104 and the second capacitor 110 is electrically coupled to the receiver coil 104 of wireless receiver 103 to cause the wireless receiver 103 to have the second resonant frequency corresponding to the trickle charge scenario.

At 314, a second current is transferred from the wireless receiver 103 to the device. The second current is produced as a function of the energy transferred between the wireless transmitter 102 and the wireless receiver 103 and the second resonant frequency of the wireless receiver 103.

Figure 4:
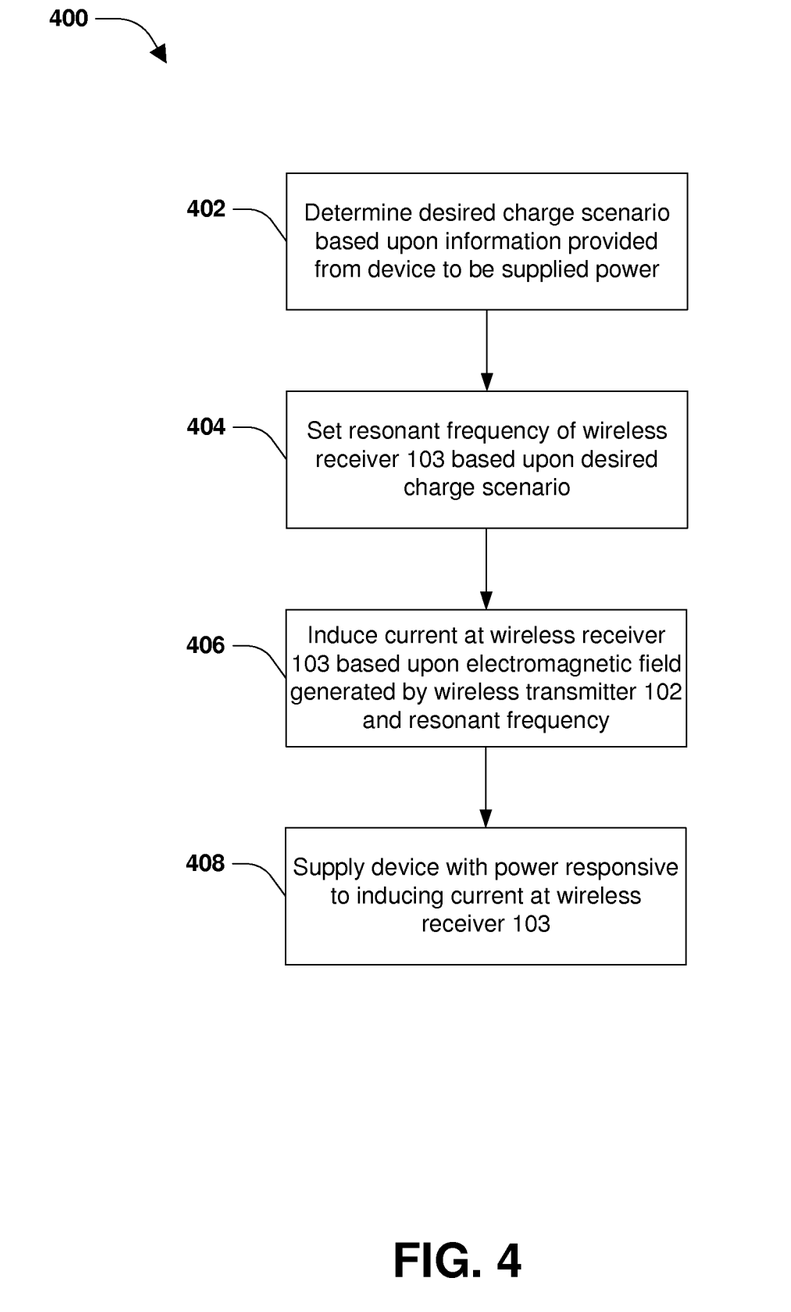
FIG. 4 is a flow diagram illustrating a method for wireless charging, in accordance with some embodiments.

FIG. 4 is a flow diagram illustrating a method 400 for wireless charging, such as using the wireless receiver 103 in FIG. 1. At 402, a desired charge scenario is determined based upon information provided from a device to be supplied power. At 404, a resonant frequency of the wireless receiver 103 is set based upon the desired charge scenario. At 406, a current is induced at the wireless receiver based upon an electromagnetic field generated by the wireless transmitter 102 and the resonant frequency of the wireless receiver 103. At 408, the device is supplied power responsive to the inducing.

Figure 5:
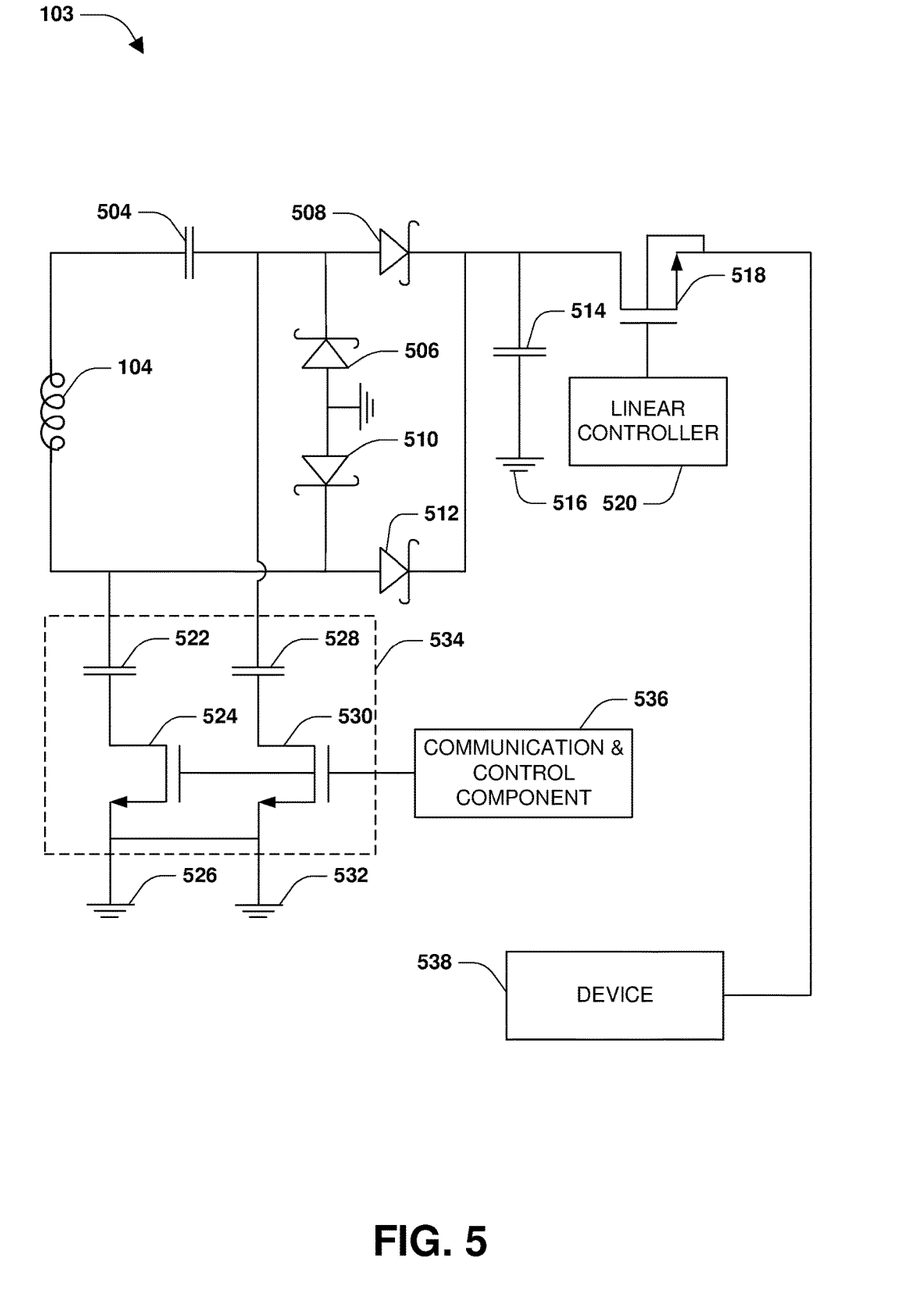
FIG. 5 is an illustration of a wireless receiver, in accordance with some embodiments.

FIG. 5 illustrates the wireless receiver 103, according to some embodiments, coupled to a device 538. In some embodiments, the device 538 comprises a portable device, such as a mobile phone, tablet, other battery-powered device, etc. In some embodiments, the wireless receiver 103 comprises the receiver coil 104. In some embodiments, the receiver coil 104 is connected to a first capacitor 504. In some embodiments, the first capacitor 504 is configured to define a resonant frequency range of the wireless receiver 103, where a resonant frequency of the wireless receiver 103 is adjusted within the range based upon a configuration of capacitors within an array 534 to achieve the resonant frequency associated with the desired charge scenario. In some embodiments, the array 534 sets the resonant frequency of the wireless receiver 103 without the use of the first capacitor 504.

In some embodiments, the wireless receiver 103 comprises a rectifier, such as a half-wave rectifier, a full-wave rectifier, etc. In some embodiments, the rectifier comprises one or more diodes 506, 508, 510, 512, such as Zener diodes, Schottky diodes, etc.

In some embodiments, at least one of the one or more diodes are semiconductor-controlled diodes. In some embodiments, at least one of the one or more diodes are silicon-controlled diodes. In some embodiments, the first capacitor 504 is connected to a first diode 506. In some embodiments, the first capacitor 504 is connected to a second diode 508. In some embodiments, the first capacitor 504 is connected to a third diode 510. In some embodiments, the first capacitor 504 is connected to a fourth diode 512. In some embodiments, at least one of the first diode 506 or the third diode 510 is connected to ground. In some embodiments, at least one of the one or more diodes is connected to a second capacitor 514. In some embodiments, the second capacitor 514 is connected to a reference voltage element 516, such as a ground reference.

In some embodiments, the rectifier first transforms a first signal induced at the receiver coil 104 into a second signal and then transforms the second signal into a third signal. In some embodiments, the first signal corresponds to an AC signal and the second signal corresponds to a positive portion or a negative portion of the first signal. In some embodiments, the third signal is a DC signal.

In some embodiments, at least one of the one or more diodes 506, 508, 510, 512 are connected to a first switch 518. In some embodiments, the first switch 518 is a transistor. In some embodiments, the first switch 518 is an n-type metal-oxide-semiconductor field effect transistor (MOSFET). In some embodiments, the first switch 518 is a p-type MOSFET. In some embodiments, the second capacitor 514 is connected to the first switch 518. In some embodiments, the first switch 518 is connected to a linear controller 520. In some embodiments, at least one of the first switch 518 or the linear controller 520 are comprised in a voltage regulation component. In some embodiments, the voltage regulation component is configured to substantially maintain a voltage applied to the device 538 by the wireless receiver 103. According to some embodiments, a same voltage is applied to the device 538 when the wireless receiver 103 switches between a configuration according to the rapid charge scenario and a configuration according to the trickle charge scenario.

In some embodiments, the receiver coil 104 is connected to the array 534. In some embodiments, at least one of the one or more diodes 506, 508, 510, and 512 are connected to the array 534. In some embodiments, the first capacitor 504 is connected to the array 534. In some embodiments, the array 534 is a capacitor array or capacitor bank. In some embodiments, the array 534 comprises a third capacitor 522, such as corresponding to at least one of 106, 110, 114 or 118 in FIG. 1. In some embodiments, the array 534 comprises a fourth capacitor 528, such as corresponding to at least one of 106, 110, 114 or 118 in FIG. 1.

In some embodiments, at least one of the third capacitor 522 or the fourth capacitor 528 are used to modify a current generated at the receiver coil 104 responsive to the energy transferred from the wireless transmitter 102. In some embodiments, selection of the third capacitor 522 causes a first current to be generated. In some embodiments, selection of the fourth capacitor 528 causes a second current to be generated. In some embodiments, the third capacitor 522 is connected to a second switch 524. In some embodiments, the second switch 524 is a transistor. In some embodiments, the second switch 524 is an n-type MOSFET. In some embodiments, the second switch 524 is a p-type MOSFET. In some embodiments, the fourth capacitor 528 is connected to a third switch 530. In some embodiments, the third switch 530 is a transistor. In some embodiments, the third switch 530 is an n-type MOSFET. In some embodiments, the third switch 530 is a p-type MOSFET. In some embodiments, the second switch 524 is connected to the third switch 430. In some embodiments, the array 534 comprises the second switch 524 and the third switch 530. In some embodiments, the second switch 524 is connected to a reference voltage element 526, such as a ground reference. In some embodiments, the third switch 430 is connected to a reference voltage element 532, such as a ground reference.

In some embodiments, the array 534 comprises one or more other capacitors. In some embodiments, the array 534 comprises one or more other switches. In some embodiments, the array 534 comprises three or more capacitors. In some embodiments, the array 534 comprises three or more switches. In some embodiments, the array 534 is connected to a communication and control component 536 configured to facilitate communications between the device 538 and the wireless receiver 103. In some embodiments, the device 538 communicates a present charge state of the device 538, a desired charge scenario, etc. to the wireless receiver 103 via the communication and control component 536. In some embodiments, the communication and control component 536 is Bluetooth®-compatible, and the communication and control component 536 communications with the device via Bluetooth®.

In some embodiments, a frequency modification component of the wireless receiver 103 corresponds to the array 534 because the resonant frequency of the wireless receiver 103 is adjustable as a function of which capacitor or capacitors are connected to the receiver coil 104.

Figure 6:
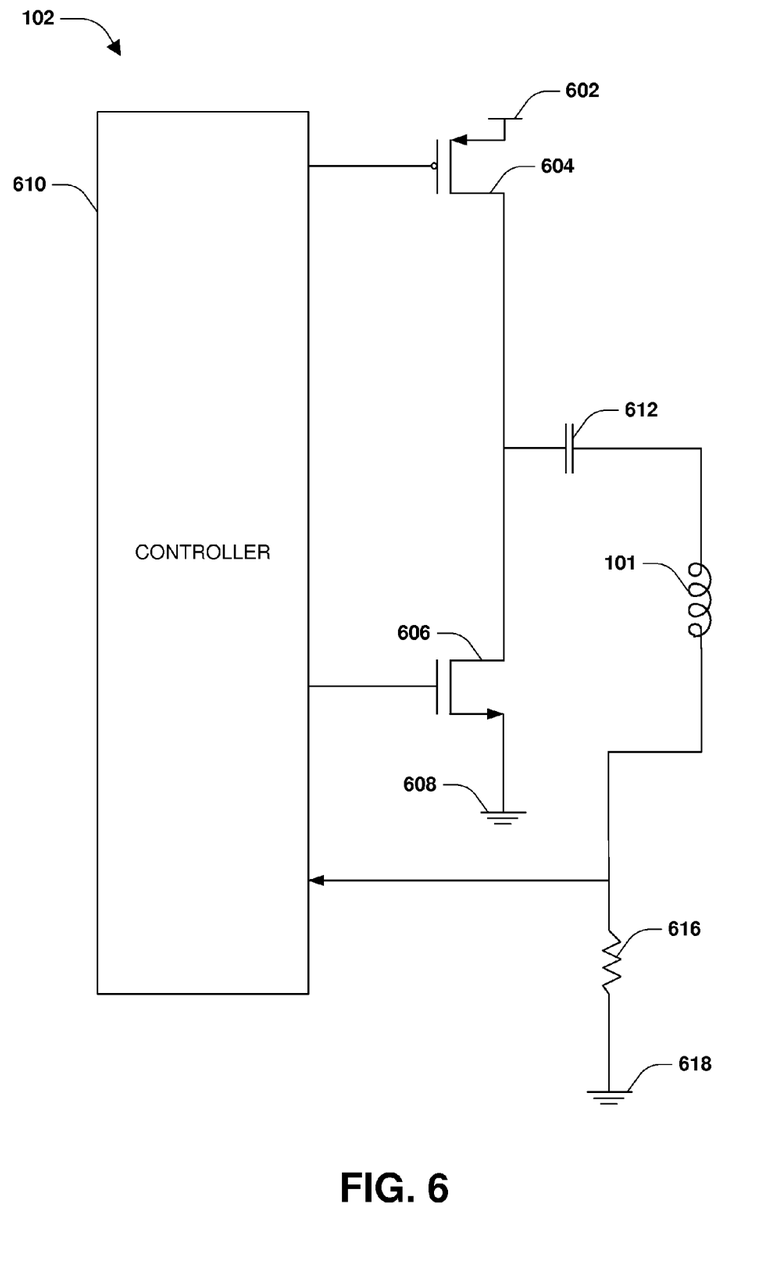
FIG. 6 is an illustration of a wireless transmitter, in accordance with some embodiments.

FIG. 6 illustrates the wireless transmitter 102, according to some embodiments. In some embodiments, the wireless transmitter 102 comprises an input node 602 for receiving power such as AC power or DC power. In some embodiments, the input node 602 is connected to a first switch 604. In some embodiments, the first switch 604 is a transistor. In some embodiments, the first switch 604 is an n-type MOSFET. In some embodiments, the first switch 604 is a p-type MOSFET. In some embodiments, the first switch 604 is connected to a second switch 606. In some embodiments, the second switch 606 is a transistor. In some embodiments, the second switch 606 is an n-type MOSFET. In some embodiments, the second switch 606 is a p-type MOSFET. In some embodiments, the second switch 606 is connected to a reference voltage element 608, such as a ground reference. In some embodiments, at least one of the first switch 604 or the second switch 606 is connected to a controller 610 configured to control energy transmission from the wireless transmitter 102 to the wireless receiver 104, such as by controlling current through the one or more transmitter coils 101.

In some embodiments, at least one of the first switch 604 or the second switch 606 is connected to a capacitor 612. In some embodiments, the capacitor 612 is connected to the one or more transmitter coils 101 of the wireless transmitter 102. In some embodiments, the one or more transmitter coils 101 are connected to a resistor 616. In some embodiments, the resistor 616 is connected to a second reference voltage element 618, such as a ground reference, to generate a feedback signal that is utilized by the controller to adjust the current through the one or more transmitter coils 101. In some embodiments, the feedback signal reduces the probability that the wireless transmitter 102 will induce an undesirable current. In some embodiments, the feedback signal reduces the probability that the wireless transmitter 102 will overheat.

In some embodiments, as current flows though the one or more transmitter coils 101, an electromagnetic field emanates from the one or more transmitter coils 101. In some embodiment, when the receiver coil 104 is spatially proximate at least some of the one or more transmitter coils 101, a current is induced in the receiver coil 104 based upon the electromagnetic field to transfer energy from the wireless transmitter 102 to the wireless receiver 103.

In some embodiments, a wireless receiver is provided. According to some embodiments, the wireless receiver comprises a receiver coil configured to receive energy from a transmitter coil, and a frequency modification component configured to set a resonant frequency associated with the wireless receiver. In some embodiments, power supplied to a device to which the wireless receiver is connected is a function of the energy and the resonant frequency.

In some embodiments, a method is provided. According to some embodiments, the method comprises determining a desired charge scenario based upon information received from a device, and setting a resonant frequency of a wireless receiver based upon the desired charge scenario. In some embodiments, the method comprises inducing a current at the wireless receiver based upon an electromagnetic field generated by a wireless transmitter and the resonant frequency. In some embodiments, the method comprises supplying the device with power responsive to the inducing.

In some embodiments, a wireless receiver is provided. In some embodiments, the wireless receiver comprises a receiver coil configured to receive energy from a transmitter coil, and a communication and control component configured to communicate with a device to which the wireless receiver is connected to determine a desired charge scenario. In some embodiments, the wireless receiver comprises a frequency modification component configured to set a resonant frequency associated with the wireless receiver based upon the desired charge scenario. According to some embodiments, power supplied to the device from the wireless receiver is a function of the energy and the resonant frequency.

Figure 7:
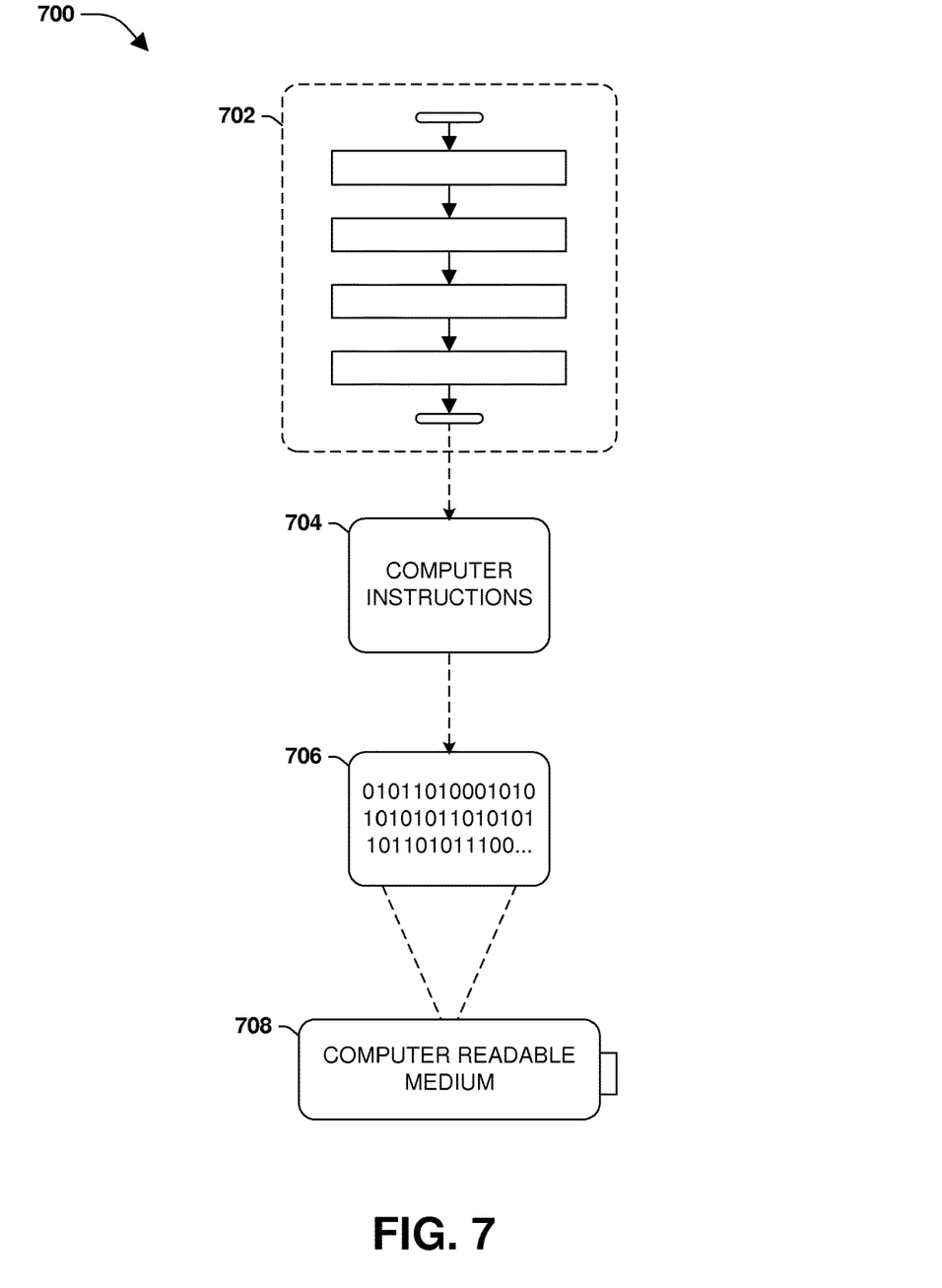
FIG. 7 is an illustration of an example computer-readable medium or computer-readable device comprising processor-executable instructions configured to embody one or more of the provisions set forth herein, according to some embodiments.

Still another embodiment involves a computer-readable medium comprising processor-executable instructions configured to implement one or more of the techniques presented herein. An example embodiment of a computer-readable medium or a computer-readable device is illustrated in FIG. 7, wherein the implementation 700 comprises a computer-readable medium 708, such as a CD-R, DVD-R, flash drive, a platter of a hard disk drive, etc., on which is encoded computer-readable data 706. This computer-readable data 706, such as binary data comprising at least one of a zero or a one, in turn comprises a set of processor-executable instructions 704 configured to operate according to one or more of the principles set forth herein when executed by a processor. In some embodiments, the processor-executable instructions 704 are configured to perform a method 702, such as at least some of at least one of the method 300 of FIG. 3 or at least some of the method 400 of FIG. 4. Many such computer-readable media are devised by those of ordinary skill in the art that are configured to operate in accordance with the techniques presented herein.

The foregoing outlines features of several embodiments so that those of ordinary skill in the art may better understand various aspects of the present disclosure. Those of ordinary skill in the art should appreciate that they may readily use the present disclosure as a basis for designing or modifying other processes and structures for carrying out the same purposes and/or achieving the same advantages of various embodiments introduced herein. Those of ordinary skill in the art should also realize that such equivalent constructions do not depart from the spirit and scope of the present disclosure, and that they may make various changes, substitutions, and alterations herein without departing from the spirit and scope of the present disclosure.

Although the subject matter has been described in language specific to structural features or methodological acts, it is to be understood that the subject matter of the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

It will be appreciated that layers, features, elements, etc. depicted herein are illustrated with particular dimensions relative to one another, such as structural dimensions or orientations, for example, for purposes of simplicity and ease of understanding and that actual dimensions of the same differ substantially from that illustrated herein, in some embodiments.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application and the appended claims are generally be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used, such terms are intended to be inclusive in a manner similar to the term "comprising". Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others of ordinary skill in the art based upon a reading and understanding of this specification and the annexed drawings. The disclosure comprises all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A wireless receiver, comprising:
 a receiver coil configured to receive energy from a transmitter coil;
 a frequency modification component configured to set a resonant frequency associated with the wireless receiver, wherein the frequency modification component comprises:
  a first frequency modification element comprising a first switch and a first capacitor coupled in series with the first switch; and
  a second frequency modification element comprising a second switch and a second capacitor coupled in series with the second switch; and
 a third capacitor coupled in series with the receiver coil, wherein:
  a first end of the receiver coil is coupled to the first frequency modification element,
  a second end of the receiver coil is coupled to a first terminal of the third capacitor,
  a first end of the second frequency modification element is coupled to a second terminal of the third capacitor,
  the first frequency modification element and the second frequency modification element are commonly coupled to a first node not directly coupled to the first end or the second end of the receiver coil, and
  power supplied to a device to which the wireless receiver is connected is a function of the energy and the resonant frequency.

2. The wireless receiver of claim 1, comprising a rectifier configured to transform a current generated at the receiver coil from an alternating current to a direct current.

3. The wireless receiver of claim 1, comprising a voltage regulation component configured to regulate a voltage associated with the power supplied to the device.

4. The wireless receiver of claim 1, wherein the resonant frequency is based upon a desired charge scenario of the device.

5. The wireless receiver of claim 1, wherein:
 the resonant frequency is based upon a desired charge scenario of the device, and
 the power supplied to the device is equal to a first wattage when the desired charge scenario corresponds to a first charge scenario and to a second wattage when the desired charge scenario corresponds to a second charge scenario.

6. The wireless receiver of claim 1, comprising a communication and control component configured to communicate with the device to determine a desired charge scenario of the device, wherein the resonant frequency is based upon the desired charge scenario.

7. The wireless receiver of claim 1, comprising a rectifier, wherein the first end of the receiver coil, the first frequency modification element, and a first diode of the rectifier are commonly coupled to a second node.

8. The wireless receiver of claim 7, wherein the third capacitor and a second diode of the rectifier are commonly coupled to a third node.

9. The wireless receiver of claim 8, wherein the third capacitor is directly coupled to the second end of the receiver coil.

10. The wireless receiver of claim 1, wherein a current is induced at the receiver coil as a function of the energy and the resonant frequency.

11. A method, comprising:
 setting a resonant frequency of a wireless receiver using a frequency modification component comprising:
  a first frequency modification element comprising a first switch and a first capacitor coupled in series with the first switch; and
  a second frequency modification element comprising a second switch and a second capacitor coupled in series with the second switch;
 inducing a current at the wireless receiver based upon an electromagnetic field generated by a wireless transmitter and the resonant frequency, wherein:
  the current flows through a third capacitor coupled in series with a receiver coil configured to receive energy from a transmitter coil,
  a first end of the receiver coil is coupled to the first frequency modification element,
  a second end of the receiver coil is coupled to a first terminal of the third capacitor,
  a first end of the second frequency modification element is coupled to a second terminal of the third capacitor, and
  the first frequency modification element and the second frequency modification element are commonly coupled to a first node not directly coupled to the first end or the second end of the receiver coil; and
 supplying a device, to which the wireless receiver is connected, with a first power responsive to the inducing, wherein the first power is a function of the energy and the resonant frequency.

12. The method of claim 11, comprising:
 determining a desired charge scenario based upon information received from the device, wherein the setting comprises setting the resonant frequency of the wireless receiver based upon the desired charge scenario.

13. The method of claim 12, comprising:
 receiving second information from the device during the supplying a device with a first power;
 determining a new charge scenario based upon the second information;
 modifying the resonant frequency based upon the new charge scenario to generate a modified resonant frequency;
 inducing a second current at the wireless receiver based upon the electromagnetic field and the modified resonant frequency; and
 supplying the device with a second power responsive to the inducing a second current.

14. The method of claim 13, the second power having a same voltage as the first power.

15. The method of claim 12, wherein:
the device is associated with a plurality of charge scenarios,
the information describes a charge status of a battery comprised within the device, and
the desired charge scenario is selected from amongst the plurality of charge scenarios as a function of the charge status.

16. The method of claim 15, wherein the charge status corresponds to a percentage to which the battery is charged.

17. The method of claim 11, wherein the setting comprising activating the first switch to create a current path between the first capacitor and a reference voltage element.

18. The method of claim 11, comprising converting the current from an alternating current (AC) to a direct current (DC), wherein the first power corresponds to DC power.

19. A wireless receiver, comprising:
a receiver coil configured to receive energy from a transmitter coil;
a communication and control component configured to receive information from a device to which the wireless receiver is connected to determine a desired charge scenario;
a frequency modification component configured to set a resonant frequency associated with the wireless receiver based upon the desired charge scenario, wherein the frequency modification component comprises:
a first frequency modification element comprising a first switch and a first capacitor coupled in series with the first switch; and
a second frequency modification element comprising a second switch and a second capacitor coupled in series with the second switch; and
a third capacitor coupled in series with the receiver coil, wherein:
a first end of the receiver coil is coupled to the first frequency modification element,
a second end of the receiver coil is coupled to a first terminal of the third capacitor,
a first end of the second frequency modification element is coupled to a second terminal of the third capacitor,
the first frequency modification element and the second frequency modification element are commonly coupled to a first node not directly coupled to the first end or the second end of the receiver coil, and
power supplied to the device from the wireless receiver is a function of the energy and the resonant frequency.

20. The wireless receiver of claim 19, the frequency modification component configured to set the resonant frequency as a first resonant frequency when the desired charge scenario corresponds to a first charge scenario and to set the resonant frequency as a second resonant frequency when the desired charge scenario corresponds to a second charge scenario.

* * * * *

UNITED STATES PATENT AND TRADEMARK OFFICE
CERTIFICATE OF CORRECTION

PATENT NO. : 10,355,527 B2  
APPLICATION NO. : 14/332471  
DATED : July 16, 2019  
INVENTOR(S) : Chien-Chung Tseng et al.

Page 1 of 1

It is certified that error appears in the above-identified patent and that said Letters Patent is hereby corrected as shown below:

On the Title Page

In item (56) titled FOREIGN PATENT DOCUMENTS, please insert data as follows:
--KR----------------------------1020121105242--

Signed and Sealed this  
Fifteenth Day of October, 2019

Andrei Iancu  
*Director of the United States Patent and Trademark Office*